Oct. 20, 1970   C. H. BLIXT ET AL   3,534,449
APPARATUS FOR FORMING CONCRETE PIPE IN SITU
Filed Oct. 12, 1967   8 Sheets-Sheet 4
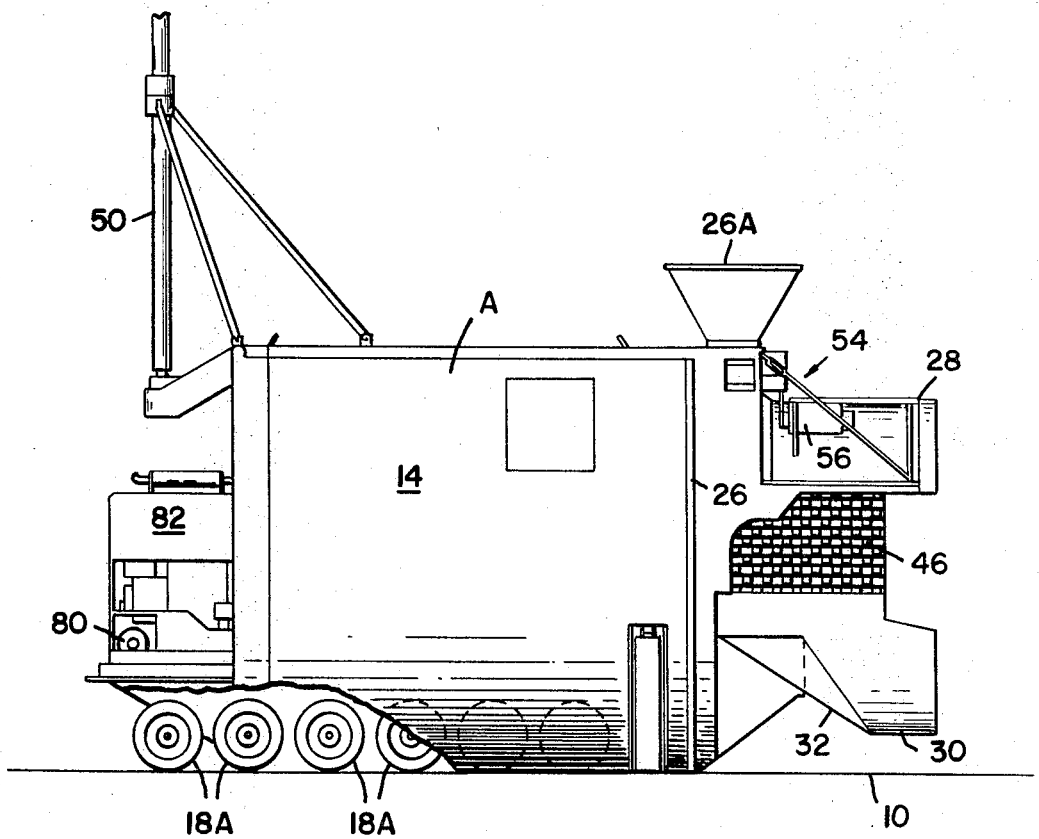
FIG_4A
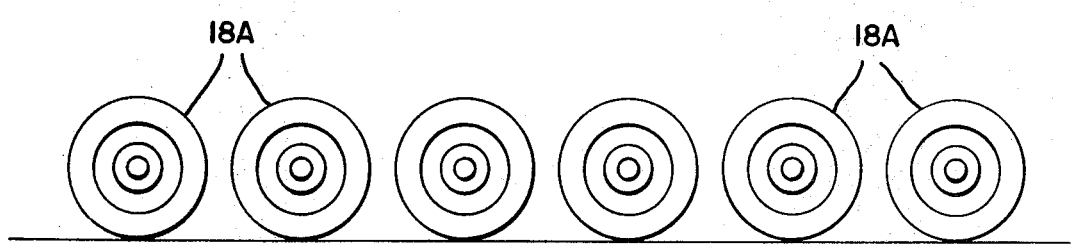
FIG_5A
INVENTORS
CLARENCE H. BLIXT
WARREN E. COZBY
BY
ATTORNEYS Oct. 20, 1970   C. H. BLIXT ET AL   3,534,449
APPARATUS FOR FORMING CONCRETE PIPE IN SITU
Filed Oct. 12, 1967   8 Sheets-Sheet 5
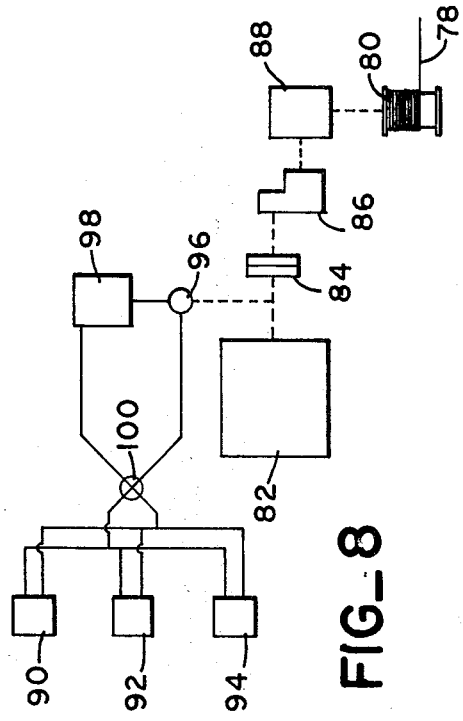
FIG_8
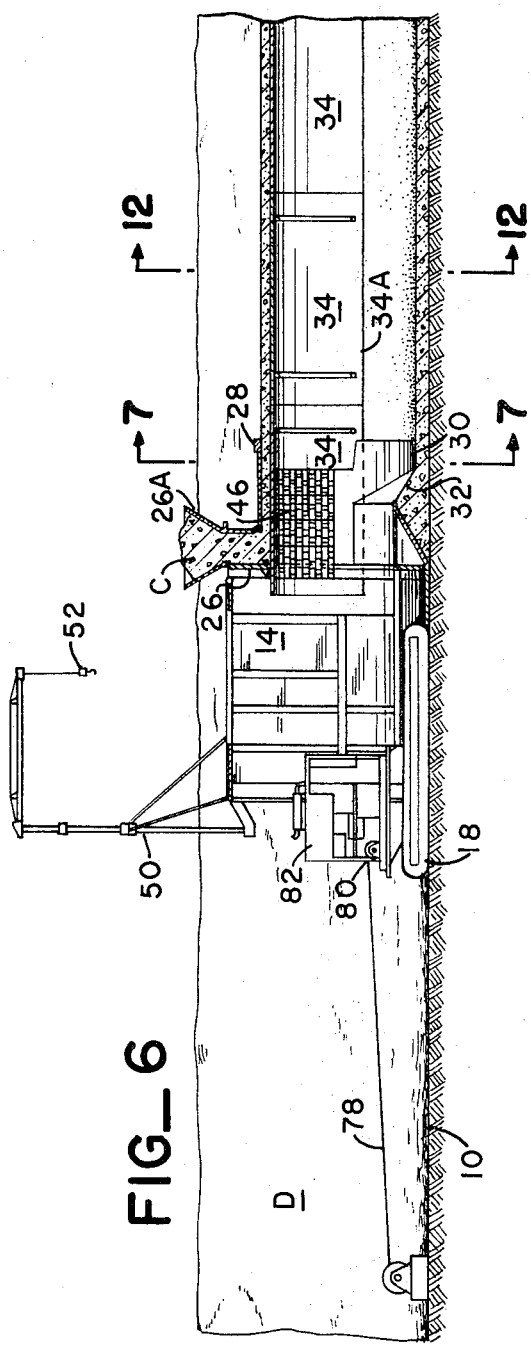
FIG_6
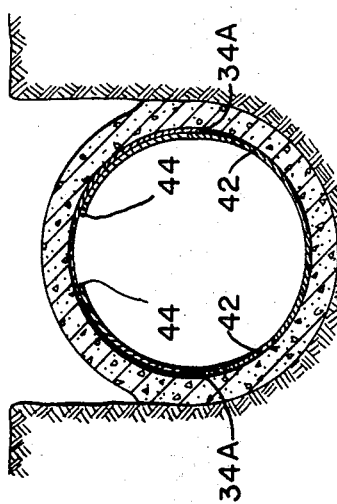
FIG_7
INVENTORS
CLARENCE H. BLIXT
WARREN E. COZBY
BY
Mellin, Moore & Weissenberger
ATTORNEYS

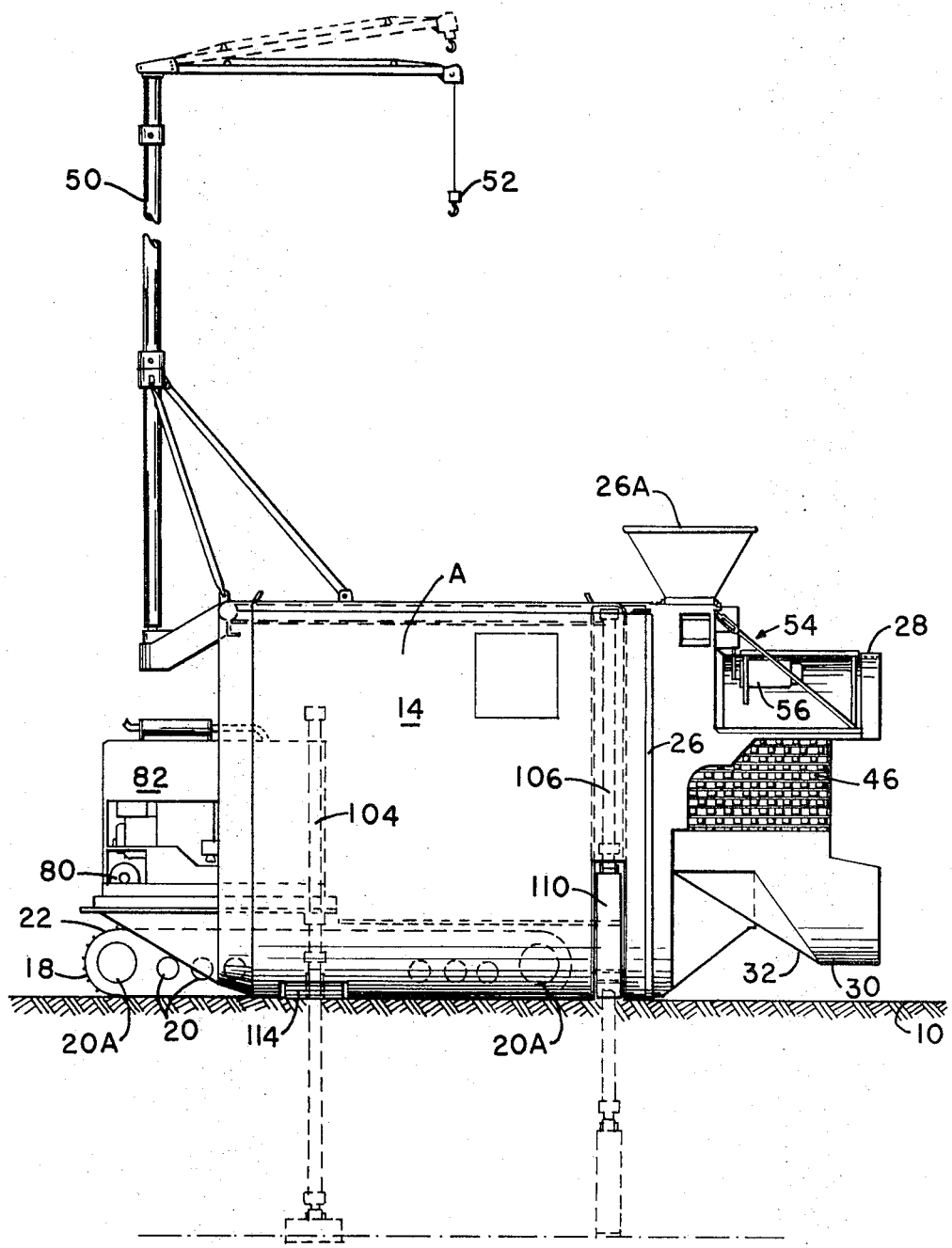
FIG_1

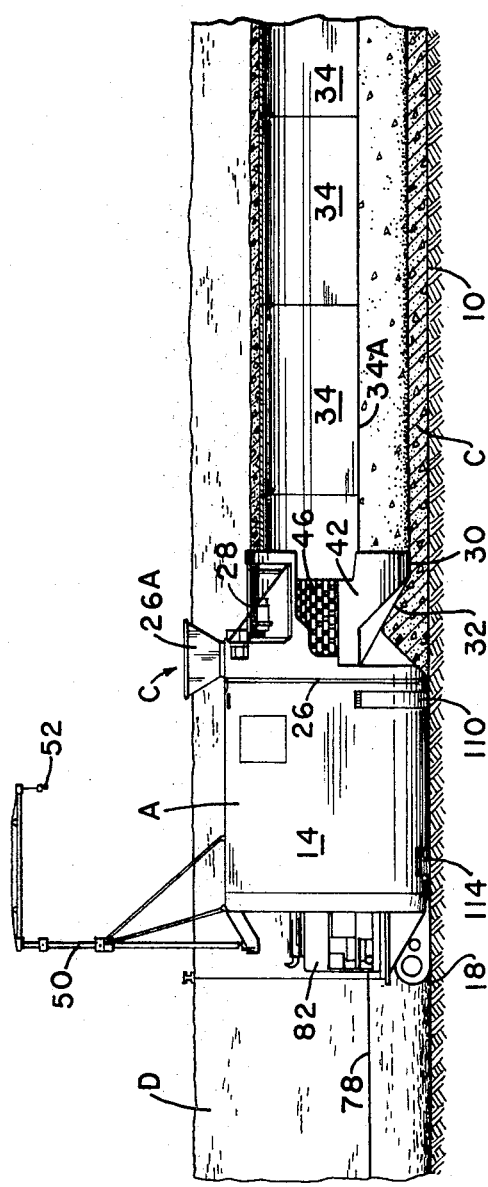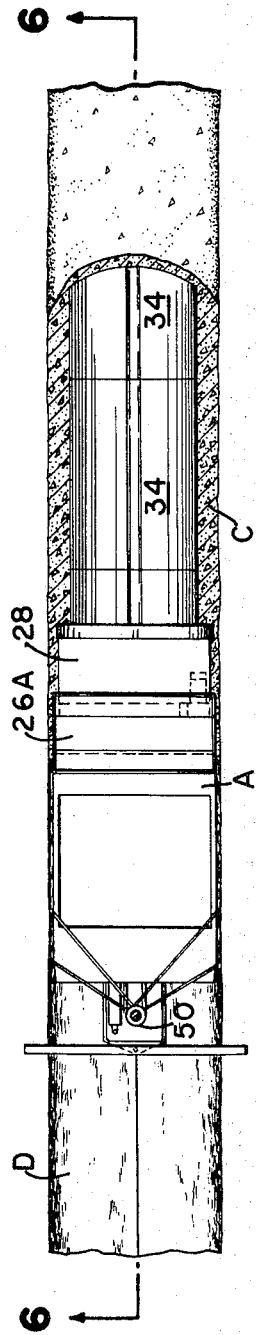

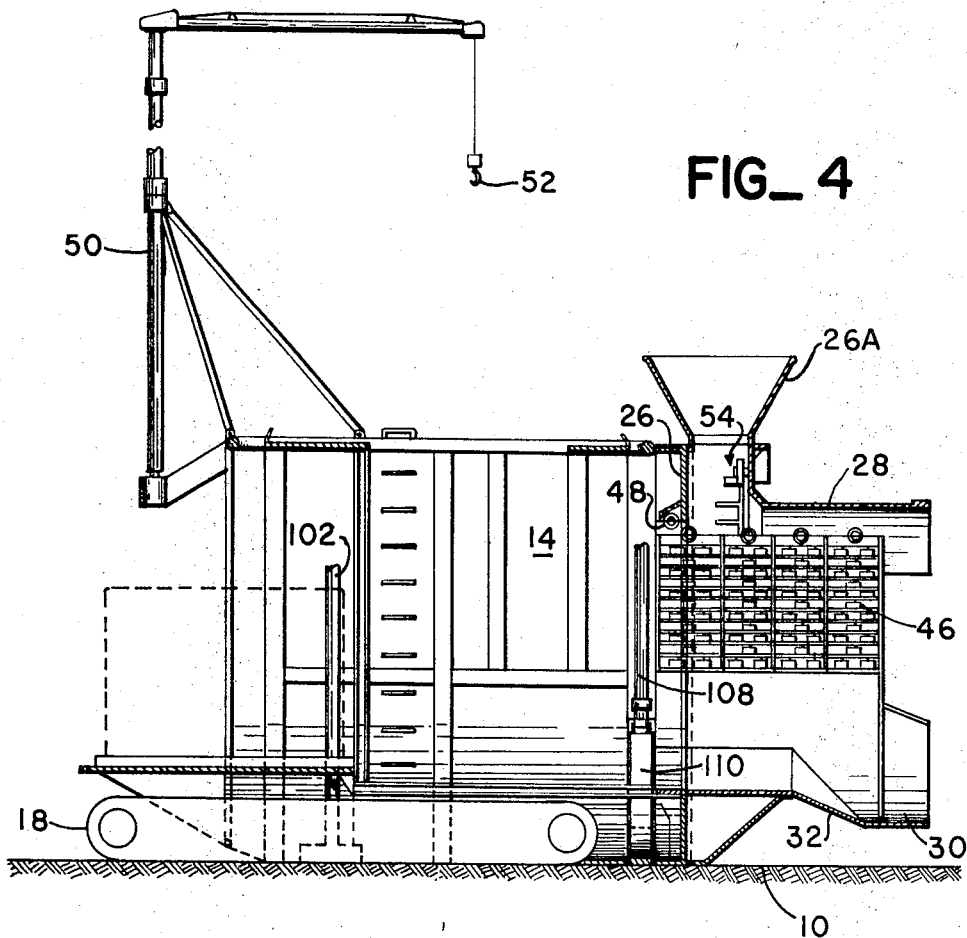
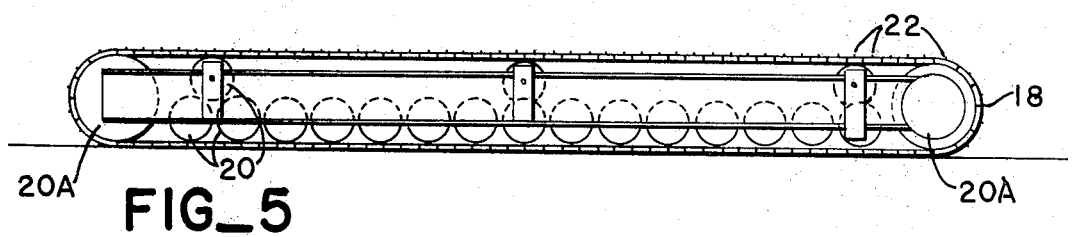

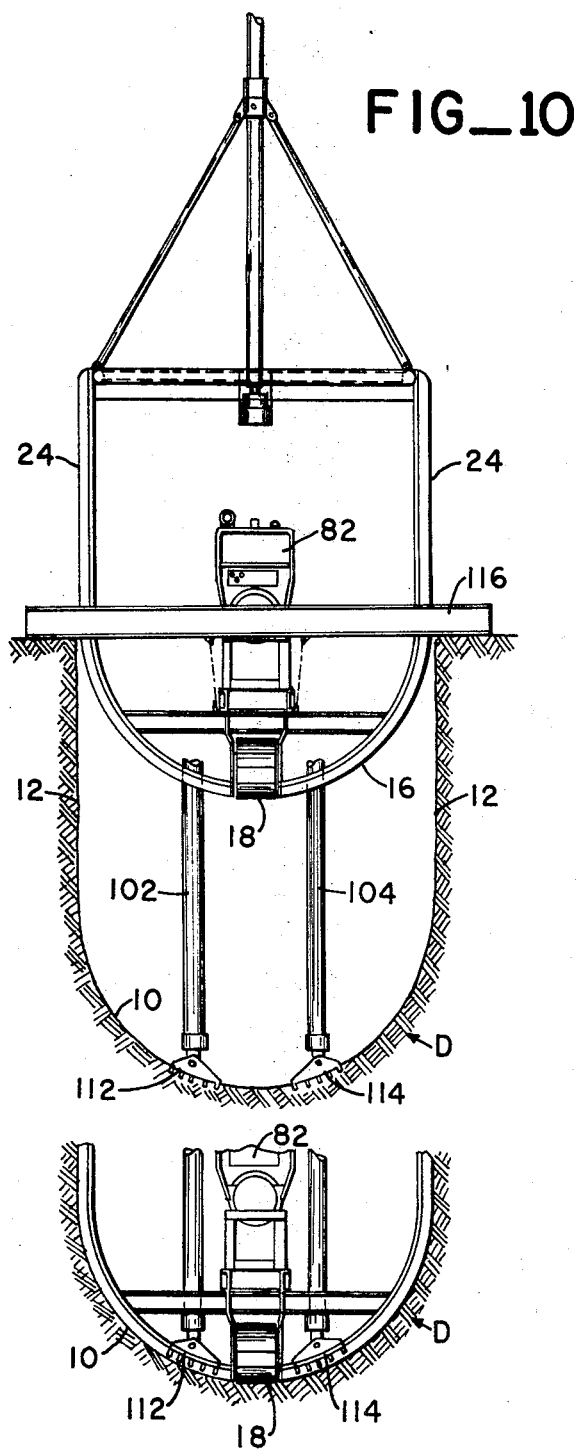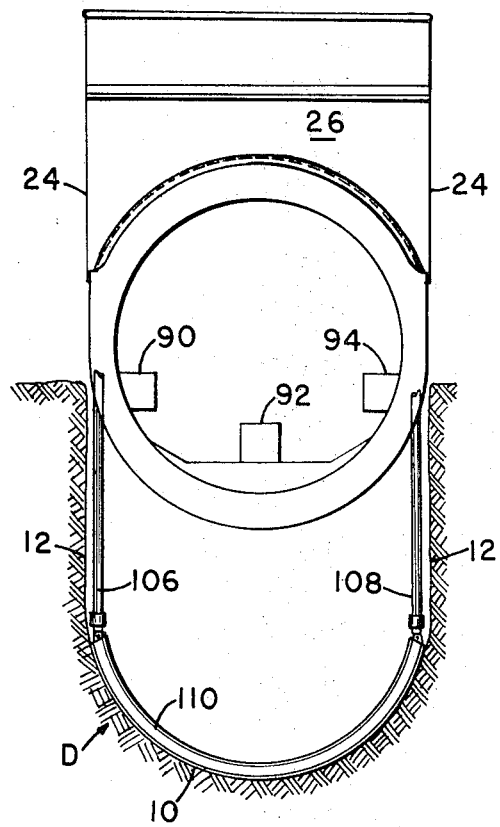

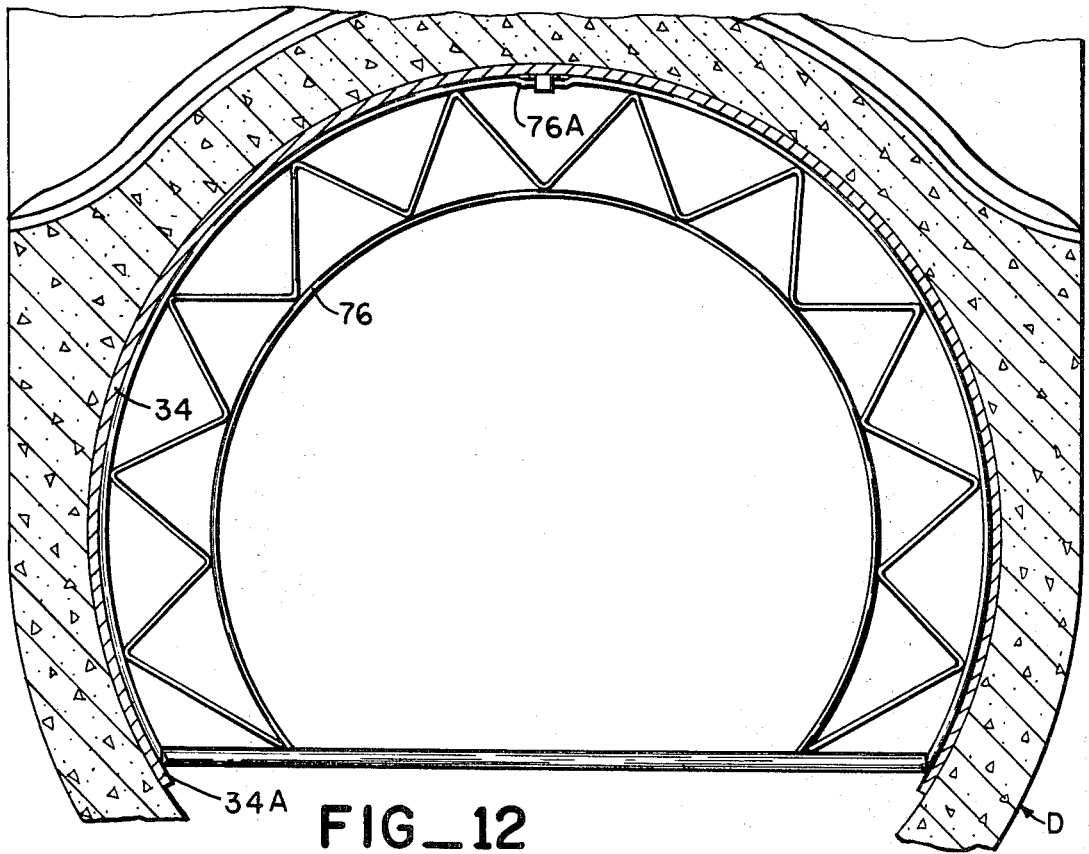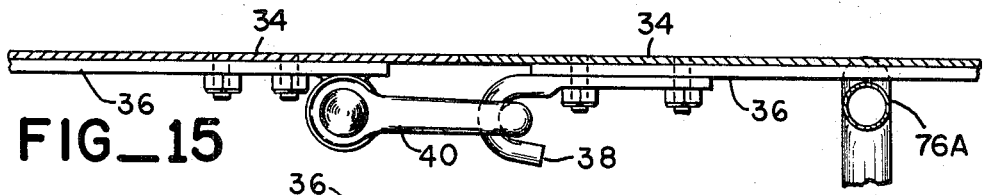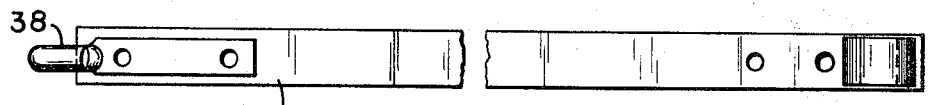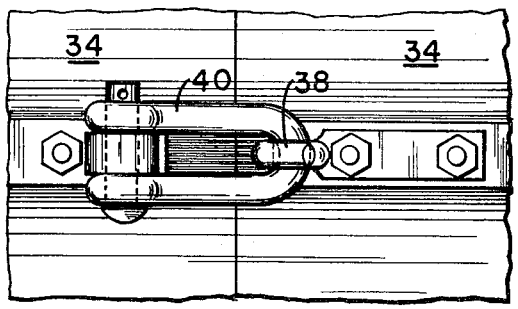

Oct. 20, 1970    C. H. BLIXT ET AL    3,534,449
APPARATUS FOR FORMING CONCRETE PIPE IN SITU
Filed Oct. 12, 1967    8 Sheets-Sheet 8
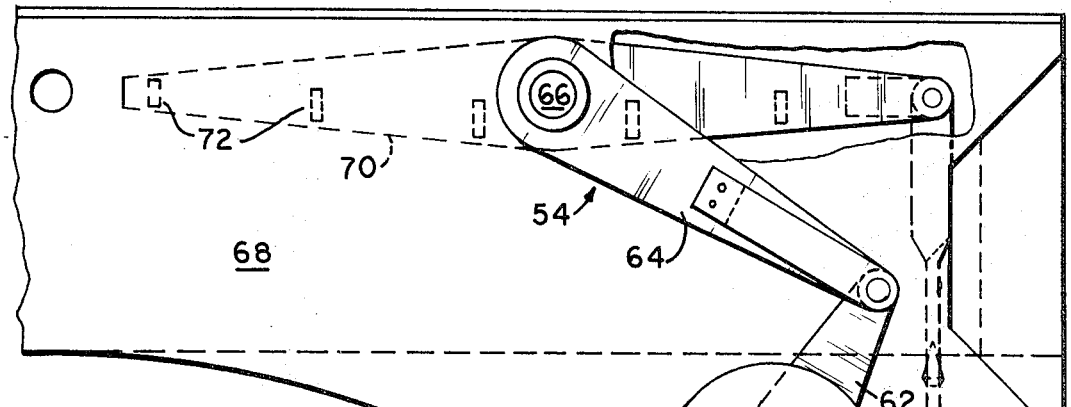
FIG_17
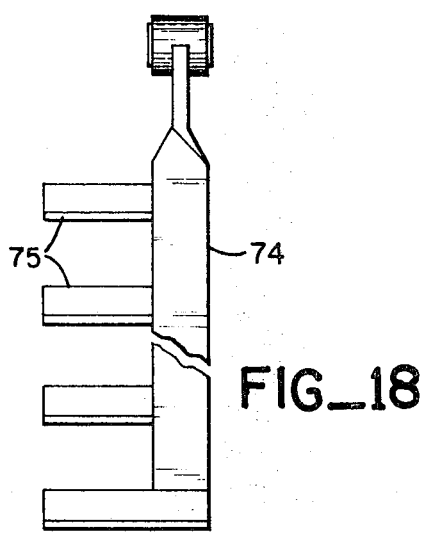
FIG_18
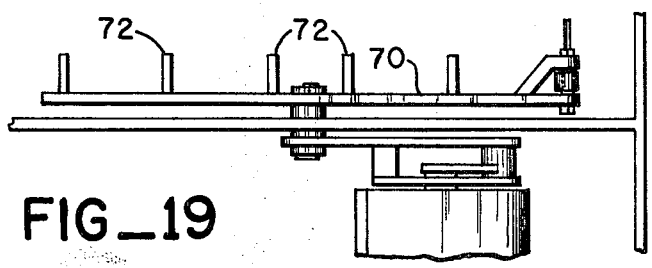
FIG_19
INVENTOR.
CLARENCE H. BLIXT
WARREN E. COZBY
BY
Mellin, Moore & Weissenberger
ATTORNEYS

# United States Patent Office 3,534,449
Patented Oct. 20, 1970

3,534,449
APPARATUS FOR FORMING CONCRETE PIPE IN SITU
Clarence H. Blixt, Escalon, and Warren E. Cozby, Farmington, Calif., assignors to No-Joint Concrete Pipe Company, Yuba City, Calif., a corporation of California
Filed Oct. 12, 1967, Ser. No. 674,890
Int. Cl. B28b 21/00; E02d 29/10
U.S. Cl. 25—32                2 Claims

ABSTRACT OF THE DISCLOSURE

Apparatus for producing cement pipe in a ditch which comprises a wall having a cross section similar to the cross section of the ditch, a track or wheels on which the wall may be moved down the ditch, an inner form made up of lower and upper members, the lower member being secured to the wall and defining a space from the bottom of the ditch, the upper member being made up of a plurality of sections releasably secured together in overlapping slidable relationship with respect to the lower member, an outer form member secured to the wall and defining a space with respect to the upper member, the outer form having an opening for introduction of settable material, and a winch for moving the wall on the track or wheels along the ditch and with respect to the upper member.

BACKGROUND OF THE INVENTION

This invention relates to the formation of concrete pipe, and more particularly to a device which is capable of continuously producing large concrete pipe in a ditch.

This invention is a development of the machine disclosed in U.S. Pat. No. 2,731,698, entitled "Apparatus For Forming Concrete Pipe In Situ," invented by E. LeRoy Tunsen. That machine has been found extremely effective in forming concrete pipe of moderate size. However, to keep pace with the demand for increased flow capacities of pipes, a machine capable of forming large (i.e., around 96″ diameter and larger) concrete pipe had to be developed. It had been known, for example, that a 96″ diameter pipe having a wall of 9″ thickness would be quite desirable from the standpoint of capacity and strength. At these dimensions, however, a cubic yard of concrete (weighing about two tons) makes little more than one foot of pipe. The extremely great weight of pipe involved brings in a number of other problems, none of which had to be considered in the design of the previous machine. For example, the machine itself must be larger and stronger, as must the inner forms. This leads to the problem of moving the heavier machine down the ditch and handling the larger and heavier upper and inner forms. Also, since so much concrete is used to manufacture a foot of pipe, and a reasonable number of feet of pipe per hour must be formed, an aid in inducing the concrete to flow about the forms was found necessary.

It is the object of this invention to provide an apparatus which overcomes these problems and is capable of forming large (i.e., around 96″ or larger) pipe in situ.

SUMMARY OF THE INVENTION

Broadly stated, the apparatus for producing a cementitious conduit in a ditch comprises an upright wall having a configuration substantially conforming to the cross-sectional configuration of the ditch in which the conduit is to be formed. Rotatable means are fixed to the wall and aligned parallel to the longitudinal axis of the ditch when the plane of the wall is arranged normal to the longitudinal axis of the ditch, whereby the wall may be moved on the rotatable means along the ditch in such position. An inner form is included and is made up of a lower movable member secured to the wall inwardly of the bottom and sides thereof and extending rearwardly of the wall and defining a space from the bottom of the ditch, and an upper member comprised of a plurality of sections releasably secured together, disposed in overlapping slidable relationship with respect to the lower movable member and extending through the wall in slidable engagement therewith. An outer form member is secured to the wall and defines a space with respect to the upper member, the outer form member having an opening therein communicating with the space between the inner form and the outer form member and between the inner form and the bottom of the ditch for introduction of settable material. Means are included for moving the wall on the rotatable means along the ditch and with respect to the upper member.

BRIEF DESCRIPTION OF THE DRAWINGS

Other objects of the invention will be evident from a study of the specification and the included drawings, in which FIG. 1 is a side elevation of the apparatus;
FIG. 2 is a side elevation of the apparatus in operation in a ditch;
FIG. 3 is a plan view thereof;
FIG. 4 is a partial section of the apparatus of FIG. 1;
FIG. 4A is a partial section of the apparatus of FIG. 1 with certain modifications made therein;
FIG. 5 is a side elevation of the track of the device of FIG. 4;
FIG. 5A is a side elevation of the wheels of the device of FIG. 4A;
FIG. 6 is a sectional view taken along the line 6—6 of FIG. 3;
FIG. 7 is a sectional view taken along the line 7—7 of FIG. 6;
FIG. 8 is a schematic diagrammatic view showing the various component parts of the drive and vibrator mechanism and other operating mechanisms of the apparatus;
FIG. 9 is a partial front end view of the apparatus;
FIG. 10 is a front end view of the apparatus showing the operation of the jacks;
FIG. 11 is a rear end view of the apparatus showing the operation of the jacks;
FIG. 12 is a sectional view taken along the line 12—12 of FIG. 6;
FIG. 13 is a side elevation of an upper inner form coupling element with a section removed;
FIG. 14 is a plan view of the element of FIG. 13;
FIG. 15 is a side elevation of the coupling members of a pair of upper inner forms in coupled position;
FIG. 16 is a plan view of the device of FIG. 15;
FIG. 17 is a side elevation of the tamping mechanism of the device;
FIG. 18 is a side elevation of a tamping arm of the device;
FIG. 19 is a plan view of the device of FIG. 17.

DESCRIPTION OF THE PREFERRED EMBODIMENT

As in the previous patent, the invention contemplates the digging of a ditch D in the ground, having a bottom portion 10 shaped to conform to part of the pipe to be cast directly in the ground. Concrete and cementitious material C is poured into a mechanism A which provides the form, in conjunction with the formed ground surface, against which the concrete mass is to be poured. The mechanism A is moved lengthwise along the earthen ditch D, and the concrete poured into the mechanism for distribution and formation of the pipe in a continuous manner within the ditch. Part of the form remains within the cast pipe until the latter has initially set and hardened sufficiently to permit removal of the sections.

In the formation of pipe, the ditch is formed to the desired depth, shape and grade. In this case the bottom 10 of the ditch is semi-circular in cross section and provides the lower outer form portion for the pipe. The ditch D has straight side walls 12 (FIGS. 9–11).

The apparatus A of FIG. 4 includes a forward frame 14 having a semi-cylindrical bottom portion 16 which conforms to the bottom 10 of the ditch D, and a track 18 mounted thereon. The track 18 is made up of a plurality of idler wheels 20 and end wheels 20A about which are disposed a plurality of cleats 22 pivotally joined to each other to form an endless chain.

In certain cases (i.e., when the pipe to be formed is extremely large), it has been found advantageous to utilize a plurality of wheels 18A (FIGS. 4A and 5A) in place of the track 18. This is so because the wheels 18A can support a greater load than the track 18. The choice of rotatable means (i.e., track 18 or wheels 18A) will thus depend on the load to be carried thereby.

With the track 18 or wheels 18A arranged parallel to the longitudinal axis of the ditch D, the apparatus M may be moved on the track 18 or wheels 18A along the ditch D. The semi-cylindrical bottom portion 16 of the apparatus A merges into parallel side members 24 that are adapted to slide along the walls 12 of the ditch D.

The rearward structure of the apparatus A includes a leading end defining a wall 26 having a configuration substantially conforming to the cross-sectional configuration of the ditch D and a hopper 26A into which the settable concrete C is poured. Extending rearward of, and secured to the hopper 26A, is an arcuate upper outer form member 28 which produces and forms the upper and outer surface of the concrete pipe. Disposed below the upper outer form member 28 is a lower inner form member 30 of arcuate shape which produces and forms the lower inner surface of the concrete pipe. This lower inner form member 30 leads from an inclined spreader portion 32.

The lower arcuate inner form member 30 extends upwardly and within upper inner forms 34 placed within the apparatus A, which provides the upper inner form portion for casting the pipe. Such upper inner form members 34 are circular in cross section, with their lower portions 34A extending substantially below the axis of the pipe. It is to be noted that each upper inner form 34 has a continuous strap 36 internally fixed thereto (FIGS. 13–16) which runs from adjacent one end thereof to adjacent the other end thereof. A hook 38 is fixed to one end of each strap 36 and a shackle 40 is pivotally fixed to the other end of each strap 36. The shackle 40 of one member 34 is adapted to be held by the hook 38 of another member 34, and thus a series of members may be releasably held together.

The upper inner form members 34 are supported by the upwardly extending sides 42 of the lower inner form member 30, which conform to the inner surface of the members 34, and their upper ends 44 are spaced apart to avoid engagement with the hooks 38, straps 36 and shackles 40 extending from the members 34.

As explained further on, the apparatus A is to be moved longitudinally with respect to the upper inner form members 34, and a plurality of rollers 46 are provided on the upwardly extending sides 42 of the lower inner form member to reduce friction between those sides 42 and the members 34. A number of spring-loaded rollers 48 are provided to bear down on the outer surface of the members 34 to lock them in proper position against the rollers 46.

In the formation of concrete pipe in the previously dug ditch D, the apparatus A is disposed in the ditch D with its lower inner form members 30 disposed in the ditch bottom 10 by a distance that is equal to the thickness of the pipe. A plurality of upper inner form members 34 are then successively placed on the upwardly extending sides 42 of the lower inner form member 30, and connected together by the hooks 38 and shackles 40 described above as the apparatus is moved down the ditch. Since the pipe to be formed is of great weight per unit length, the upper inner form members 34 must of necessity be of substantial weight. Because additional upper inner form members 34 are to be introduced through the apparatus forwardly of the most forward of the connected members 34 as the apparatus moves along the ditch, as described later, a crane 50 is fixed relative to the wall 26 for performing such operation. As will be seen from the drawings, the pickup 52 of crane 50 is movable to a variety of positions. The members 34 introduced by means of crane 50 are disposed longitudinally under the hopper 26A and extend forwardly under the upper outer form member 28. The space between the members 34 and upper outer form member 28 is also equal to the thickness of the pipe to be cast.

Concrete C of proper mix and consistency is poured into the hopper 26A and will gravitate down around the inner form members 34 and 30 and to a position forward of the inclined spreader portion 32. At the time the pipe is being formed the upper inner form member 34 and the lower inner form member 30 co-act to make a full circle form. Aiding this flow of concrete C into the proper spaces is a tamper mechanism 54 which is fixed to the apparatus A adjacent the hopper 26A. This mechanism 54 is shown generally and in detail in FIGS. 17–19. Fixed relative to the apparatus A on each side thereof is a motor 56 having a rotatable shaft 58. Fixed to the rotatable shaft 58 near its periphery is a pin 60 which travels in a circular path as the shaft 58 rotates. The pin 60, traveling in such circular path, moves with it a connecting rod 62 the end of which is pivotally attached to an arm 64 which is fixed to a shaft 66 which in turn is pivotally supported in the wall 68 of the apparatus A. It will be seen that as shaft 58 is rotated, arm 64 will swing back and forth. Also fixed to shaft 64, but on the opposite side of wall 68 (i.e., where concrete C flows), is tamper arm 70. This arm 70 has a series of ribs 72 fixed thereto. As the arm 70 reciprocates (through shaft 66), the arm 70 itself and the ribs 72 act on the concrete C being poured into the machine to agitate and aid in introducing the concrete C into the proper areas. Pivotally fixed to the outer end of arm 70 is a rod 74 which extends down into the side of the apparatus A and which has a series of extensions 75 fixed thereto which are substantially triangular in cross section, with an angle of the triangle being pointed upward. It will be seen that as arm 70 reciprocates, rod 74 moves up and down. Rod 74 and extensions 75 act to agitate the concrete C to further aid in introducing it into the proper areas. A similar tamper mechanism is disposed symmetrically to the tamper mechanism 54 on the opposite side of the apparatus A, and performs similar functions.

The apparatus A is then moved in a forward direction on the track 18 or wheels 18A. It is to be noted that when the track 18 is (or wheels 18A are) aligned parallel to the longitudinal axis of the ditch D, the plane of the wall 26 itself is normal to the longitudinal axis of the ditch D. As the apparatus A is so moved, the upper inner form members 34 remain stationary, so that the inclined spreader portion 32 disposes the concrete C completely about the lower part of the inner form members 34, 30, and the upper outer form members 28 dispose the concrete C properly about the upper portion of the upper inner form member 34. The parts are maintained in proper spaced relation with respect to the walls of the ditch D by engagement of the sides 24 of the apparatus A with the sides 12 of the ditch D. The lower and upper form members 30 and 28 move forward in direction, causing the rearward portion of an upper inner form member 34 to be unsupported and exposed. This exposed portion is braced by placing a triangulated brace 76 therewithin. It will be seen that the brace 76 is of extremely strong construction, so that the great weight of the members 34 and concrete C may be borne properly. These braces 76 are formed with depressions 76A at the top thereof so that there will be no interference with straps 36. As the apparatus A moves forward, braces 76 may be moved and other braces 76 added to insure that the members 34 are supported throughout their exposed length.

As the movement of the apparatus A in a forward direction is continued, additional upper inner form members 34 are added in line through the top of the apparatus A and positioned at the front of inner form member 30 rearwardly of wall 26 and connected to the rearward end of the line of upper inner form members 34 by means of crane 50, and are attached to one another by means of hooks 38 and shackles 40. Concrete C is continuously deposited as needed and drops around the members 34, 30, the lower inner form member 30 producing the lower inner surface of the pipe and the upper outer form member 28 forming the upper outer surface of the pipe. The upper inner form members 34 produce the main portion of the inner shape of the pipe, these members remaining in place, braced by braces 76 until the concrete C has set and hardened sufficiently to be form-sustaining. The braces 76 may then be removed by a person within the cast pipe and the members 34 unhooked and withdrawn from the pipe.

The apparatus A is moved forward by attaching a cable 78 to a winch 80 mounted at the front of the apparatus A. The winch 80 is driven by a gasoline engine 82 that rotates the winch 80 through a clutch 84, speed reducer 86, and variable speed transmission 88. As the winch 80 is rotated, it winds the cable 78 on its drum, and, with the forward end of the cable 78 fixed to a dead man positioned down the ditch D forwardly of the apparatus A, the winding action pulls the apparatus A along the ditch D. This movement is greatly facilitated by the track 18 (or wheels 18A) on which the heavy (in the order of 25–30 tons) machine travels. It will be noted (FIG. 6) that the upper inner form members 34 are in slidable engagement with the wall 26 of the apparatus A.

It has been found preferable to vibrate the concrete C to aid in properly disposing it, and thus vibrators 90, 92, 94 are provided as shown in FIGS. 8 and 11. The vibrating effect may be obtained from electric vibrators or from hydraulic vibrators operated by the gasoline engine 82. If electric vibrators are used, the electrical power may be taken from a generator driven by the engine 82. The engine 82 may in the alternative drive a suitable pump 96 that draws liquid from a reservoir 98 and forces it through a valve 100 connected to hydraulic vibrators 90, 92, 94, if hydraulic vibrators are used. The valve 100 is operated to control the frequency of the vibrators, depending on the consistency of the concrete C.

After a desired length of pipe has been formed, the apparatus A may be removed from the ditch by means of a large separate crane (not shown). In some situations, however, it may be inconvenient or impossible, because of space limitations, to remove the apparatus A by means of such crane. To take care of this contingency, the apparatus is equipped with legs 102, 104 at the front thereof, and legs 106, 108 at the rear thereof, which act as hydraulic jacks which are adapted to apply force to the ditch D to lift the apparatus A from the bottom 10 of the ditch D (FIGS. 9-11). It will be noted that the rear legs 106, 108 act on a U-shaped member 110 to lift that end of the apparatus A. This U-shaped member 110 allows sufficient space for the upper inner form members 34 to be pulled therethrough when the apparatus is so lifted. However, because of the position of track 18 or wheels 18A, it is not possible to utilize such a U-shaped member at the front of the machine and so the legs 102, 104 act through individual feet 112, 114 to lift that end of the apparatus A. The position of these legs 102, 104 are such that space is not sufficient to allow the upper inner form members to be pulled therethrough. However, the front end of the apparatus A may be hung from a beam 116 laid across the ditch D (FIG. 10) after it has been raised on legs 102, 104, 106, 108 and the legs 102, 104 may be retracted, allowing the members 34 to be slid all the way through.

It will be seen that applicants have provided an apparatus which is capable of forming concrete pipe of the order of 96" in diameter or over in situ. This is made possible by the use of the track or wheels, tamper, jacks, crane, and other elements and features described above, which make it feasible to handle the enormous load involved in the production of this pipe.

Although a preferred embodiment of this invention has been illustrated and described, various changes may be made without departing from the spirit of the invention or the attached claims, and it is to be understood that such changes are contemplated.

We claim:

1. Apparatus for producing a cementitious conduit in a ditch, comprising:
   (a) an upright wall having a configuration substantially conforming to the cross-sectional configuration of the ditch in which the conduit is to be formed;
   (b) rotatable means fixed relative to the wall and aligned parallel to the longitudinal axis of the ditch when the plane of the wall is arranged normal to the longitudinal axis of the ditch, whereby the wall may be moved on the rotatable means along the ditch in such position;
   (c) an inner form comprising:
      (i) a lower movable form member secured to the wall inwardly of the bottom and sides thereof and extending rearwardly of the wall and defining a space from the bottom of the ditch, and
      (ii) an upper form member comprised of a plurality of sections disposed in overlapping slidable relationship with respect to the lower movable member and extending through the wall in slidable engagement therewith, means releasably securing said sections together, said means comprising a continuous strap internally fixed to each section and running from adjacent one end thereof to adjacent the other end thereof, a hook fixed to the one end of the strap, and a shackle pivotally fixed to the other end of the strap, the shackle of one section being adapted to be held by the hook of the section to which it is to be releasably secured;
   (d) an outer form member secured to the wall and defining a space with respect to said upper form member, said outer form member having an opening therein communicating with the space between the inner form and the outer form member and between the inner form and the bottom of the ditch for the introduction of settable material;
   (e) means for towing the wall on the rotatable means along the ditch and with respect to the upper member; and
   (f) a crane fixed relative to said wall for introducing additional sections of upper members forwardly of the most forward of those sections as the wall is moved along the ditch.

2. Apparatus according to claim 1 wherein a plurality of jacks are fixed relative to the wall and adapted to apply force to the ditch to lift the apparatus from the bottom of the ditch.

(References on following page)

References Cited

UNITED STATES PATENTS

| | | | |
|---|---|---|---|
| 2,731,698 | 1/1956 | Tunsen | 25—32 |
| 2,948,942 | 8/1960 | Gordan | 25—32 |
| 3,032,852 | 5/1962 | Hanson | 25—32 |
| 3,106,760 | 10/1963 | Tunsen | 25—32 |
| 3,113,364 | 12/1963 | Blixt | 25—32 |
| 3,161,117 | 12/1964 | Supject | 25—32 X |
| 3,306,467 | 2/1967 | Weempe | 214—77 X |
| 3,338,546 | 8/1967 | Fuller | 25—32 X |
| 3,350,063 | 10/1967 | Thurlow et al. | 254—45 |

ROBERT D. BALDWIN, Primary Examiner

U.S. Cl. X.R.

61—72.2; 214—77